(12) United States Patent
Shanbhag

(10) Patent No.: US 7,855,998 B2
(45) Date of Patent: Dec. 21, 2010

(54) GB PARAMETER BASED RADIO PRIORITY

(75) Inventor: Vyankatesh Shanbhag, Plano, TX (US)

(73) Assignee: Tektronix, Inc., Beaverton, OR (US)

( * ) Notice: Subject to any disclaimer, the term of this patent is extended or adjusted under 35 U.S.C. 154(b) by 2895 days.

(21) Appl. No.: 10/289,767

(22) Filed: Nov. 7, 2002

(65) Prior Publication Data

US 2003/0095527 A1 May 22, 2003

Related U.S. Application Data

(60) Provisional application No. 60/347,981, filed on Nov. 7, 2001, provisional application No. 60/337,731, filed on Nov. 8, 2001.

(51) Int. Cl.
*H04W 4/00* (2009.01)
(52) U.S. Cl. .................. 370/338; 370/395.42
(58) Field of Classification Search .............. None
See application file for complete search history.

(56) References Cited

U.S. PATENT DOCUMENTS

| | | |
|---|---|---|
| 4,430,701 A | 2/1984 | Christian et al. |
| 5,197,002 A | 3/1993 | Spencer |
| 5,287,499 A | 2/1994 | Nemes |
| 5,566,171 A | 10/1996 | Levinson |
| 5,566,297 A | 10/1996 | Devarakonda et al. |
| 5,594,863 A | 1/1997 | Stiles |
| 5,623,601 A | 4/1997 | Va |
| 5,708,655 A | 1/1998 | Toth et al. |
| 5,758,088 A | 5/1998 | Brezaire et al. |
| 5,761,405 A | 6/1998 | Tadamura et al. |
| 5,799,154 A | 8/1998 | Kuriyan |
| 5,841,764 A | 11/1998 | Roderique et al. |
| 5,896,496 A | 4/1999 | Suzuki |
| 5,987,320 A | 11/1999 | Bobick |
| 6,018,805 A | 1/2000 | Ma et al. |
| 6,044,272 A | 3/2000 | Kobylinski et al. |
| 6,070,190 A | 5/2000 | Reps et al. |
| 6,085,105 A | 7/2000 | Becher |
| 6,144,849 A | 11/2000 | Nodoushani et al. |
| 6,148,177 A | 11/2000 | Faris et al. |
| 6,173,384 B1 | 1/2001 | Weaver |

(Continued)

FOREIGN PATENT DOCUMENTS

EP 1061699 12/2000

(Continued)

OTHER PUBLICATIONS

Pricing Differentiated Services in the GPRS Environmnet—Sergios Soursos, et al. 1st Workshop on Wireless Mobile Internet, Rome, Italy Jul. 2001.

(Continued)

*Primary Examiner*—Robert W Wilson
(74) *Attorney, Agent, or Firm*—Fulbright & Jaworski L.L.P.

(57) ABSTRACT

A system and method for transmitting data packets to a wireless client is presented herein. The data packets are received by a wireless content switch in the wireless network. The wireless content switch assigns the priority of transmission for the data packet based on both the purchased level of service by the subscriber receiving the data packet, as well as the application the data packet is transmitted.

14 Claims, 3 Drawing Sheets

U.S. PATENT DOCUMENTS

| | | | |
|---|---|---|---|
| 6,178,331 | B1 | 1/2001 | Holmes et al. |
| 6,201,962 | B1 | 3/2001 | Stumiolo et al. |
| 6,215,994 | B1 | 4/2001 | Schmidt et al. |
| 6,226,267 | B1 | 5/2001 | Spinney et al. |
| 6,230,165 | B1 | 5/2001 | Cook, III |
| 6,760,344 | B2 * | 7/2004 | Mizell et al. ................ 370/475 |
| 6,970,423 | B2 * | 11/2005 | Chuah ........................ 370/230 |
| 7,451,205 | B2 * | 11/2008 | Cheung et al. .............. 709/224 |
| 2001/0028636 | A1 | 10/2001 | Skog et al. |
| 2001/0037358 | A1 | 11/2001 | Clubb et al. |
| 2002/0009986 | A1 | 1/2002 | Bern et al. |
| 2002/0118663 | A1 | 8/2002 | Dorenbosch et al. |
| 2003/0095526 | A1 * | 5/2003 | Froehlich et al. ............ 370/338 |
| 2003/0095527 | A1 * | 5/2003 | Shanbhag ................... 370/338 |

FOREIGN PATENT DOCUMENTS

| | | |
|---|---|---|
| WO | 99/16266 | 4/1999 |
| WO | WO 00/10357 | 2/2000 |
| WO | 00/18154 | 3/2000 |
| WO | 00/21231 | 4/2000 |

OTHER PUBLICATIONS

QoS in GPRS; Georgios Karagiannis; Open Report. Dec. 21, 2000.

Improving TCP/IP Performance over Wireless Networks—Hari Balakrishnan, et al. In Proc. 1st ACM Int'l Conf. Mobile Computing and Networking (MobiCom) Nov. 1995.

Layer 4+ Switching With QOS Support for RTP and HTTP; Till Harbaum, et al.; Global Telecommunications Conference—Globecom '99.

1xRTT End-to-End Performance Evaluation;Hang Zhang, et al. Version 1.0, Jul. 15, 1999.

TCP for Wireless and Mobile Hosts (MobiCom '99 Tutorial)i; Nitin H. Vaidya, Texas A&M University.

* cited by examiner

GB PARAMETER BASED RADIO PRIORITY

CROSS-REFERENCE TO RELATED APPLICATIONS

This application claims the priority benefit of U.S. Provisional Applications for Patent, Ser. No. 60/347,981, entitled "Gb Parameter Based Radio Priority," filed on Nov. 7, 2001 and Ser. No. 60/337,731, entitled "Cell Level Congestion Policy Management," filed on Nov. 8, 2001 which are hereby incorporated by reference for all purposes. This application is related to U.S. patent application Ser. No. 10/289,638, filed Nov. 7, 2002 entitled "Cell Level Congestion Policy Management," which is commonly assigned with the present application and is hereby incorporated by reference.

STATEMENT REGARDING FEDERALLY SPONSORED RESEARCH/DEVELOPMENT

Not Applicable.

FIELD

The present application relates to wireless packet data networks, and more particularly to Gb parameter based radio priority.

BACKGROUND

Wireless networks which were originally designed for wireless telephone services are being adapted for wireless data services as well. The wireless networks are adapted for wireless data services by linking the wireless network to the preexisting wired data network, wireless packet data protocols such as General Packet Radio Services (GPRS) were developed to facilitate the transmission of data packets over the wireless network.

The most common wired data network is the Internet. The Internet is a global network connecting computers from government agencies, education institutions, the military, and businesses from around the world. Data is transmitted over the Internet using data packets. The data packets are sent from a sender to a recipient over any one of a number of network connections between the sender to the recipient.

Where the recipient is a wireless client, the data packet is sent from the wired network, e.g., the Internet, to a wireless network associated with the wireless client. The wireless network routes the data packet to a radio transceiver region that maintains radio communications with the wireless client. The radio transceiver transmits the data packet over the wireless interface to the wireless client.

The available bandwidth for transmission of data packets over the wireless air interface is usually lower as compared to other parts of the communication network. As a result., a backlog of data packets exists for transmission over the air interface. The resulting backlog significantly affects the throughput rate of the wireless packet data network.

The data packets are transmitted in accordance with a priority scheme, wherein each data packet is associated with a particular priority. For example, in a GPRS network, each data packet is associated with a radio priority, wherein packets with the highest radio priority level are transmitted first.

The assignment of radio priority is based on a subscriber profile parameter which is associated with the subscriber at the wireless client. The subscriber profile parameters is known as the Quality of Service parameter. Accordingly, the wireless network provider can offer different levels and prices for subscription, based on the Quality of Service parameter which determines the priority of transmission for data packets.

However, the perceived quality of service from the user's point of view varies based on the user's application. For example, where a user's application is streaming video application, a high data throughput rate will be required for a satisfactory perceived quality of service. On the other hand, where the user's application is email, a considerably lower throughput rate will result in a satisfactory level of service. The foregoing can be true, even where the subscribers have paid for similar level of services. Therefore, subscriber satisfaction can be maintained by provisioning the lowest level of priority to data packets associated with the streaming video, and a higher level of priority to the packets associated with the email application.

Accordingly, it would be advantageous if the priority of transmission for the data packets were based on the application type, as well as the subscriber's purchased level of service.

SUMMARY

A system and method far transmitting data packers to a wireless client is presented herein. The data packets are received by a wireless content switch in the wireless network. The wireless content switch assigns the priority of transmission for the data packet based on both the purchased level of service by the subscriber receiving the data packet, as well as the application pursuant to which the data packet is transmitted.

DETAILED DESCRIPTION OF THE DRAWINGS

Figure 1:
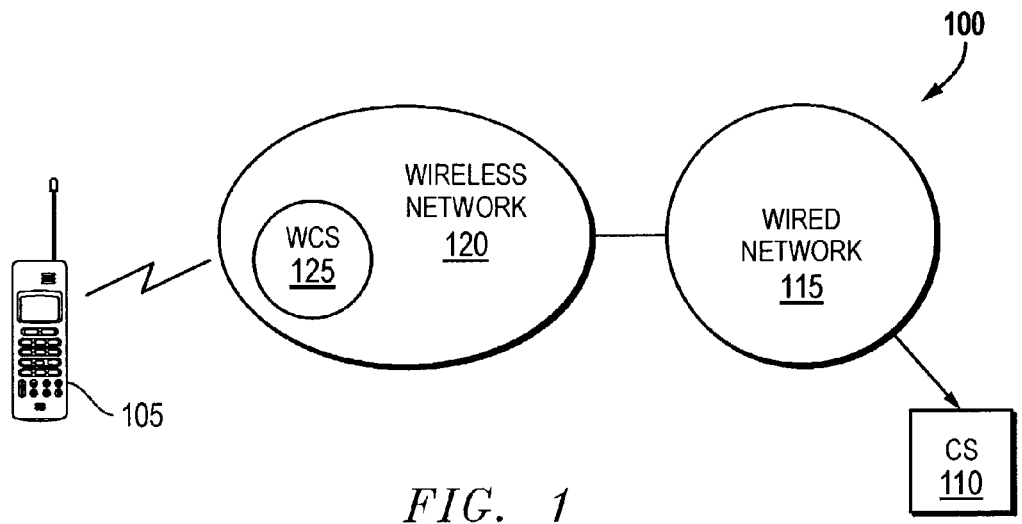
FIG. 1 is a block diagram of an exemplary communication network.

In the descriptions which follow, like parts are marked throughout the specification and drawings with the same numerals, respectively. The drawing figures are not necessarily drawn to scale and certain figures may be shown in exaggerated or generalized form in the interest of clarity and conciseness.

Referring now to FIG. 1, there is illustrated a block diagram of an exemplary communication network for transmitting data packets to a wireless client 105 from a content server 110. The wireless client 105 is a mobile terminal generally associated with a user or subscriber to the communication network 100, and can comprise, but is not limited to, a mobile station, a personal digital assistant, or a lap top or palm top computer capable of engaging in wireless data communications.

The content server 110 is a server computer which can include, for example, a web server. The content server 110 is generally connected to a wired network 115. The wired network 115 can comprise, for example, a local area network, a wide area network, or the Internet. Data is transmitted over the wired network 115 in a series of sequential partitions, know as data packets.

The wired network 115 is interfaced with a network 120 associated with the wireless client 105. The wireless network 120 includes a network of nodes which routes data packets to a geographic location within radio communication of the wireless client 105 and transmits the data packets over the wireless air interface to the wireless client 105. The wireless network 120 also includes a wireless content switch 125. The wireless content switch 125 is positioned in a manner to receive the data packets which are transmitted to and from the wireless client 105.

The available bandwidth for transmission of data packets over the wireless air interface is usually lower as compared to other parts of the communication network 100. As a result, a backlog of data packets exists for transmission over the air interface. The resulting backlog significantly affects the throughput rate of the communication network.

The data packets are transmitted over the wireless air interface in accordance with a priority scheme, wherein each data packet is associated with a particular priority. The assignment of radio priority is based on the level of services which the subscriber associated with the wireless client 105 has purchased, as well as the application pursuant to which the subscriber is receiving the data packets. When the data packets are received by the wireless content switch 125, the wireless content switch 125 determines the subscriber's level of services and the application pursuant to which the data packets are transmitted. The wireless content 125 then assigns a radio priority based on both the subscriber's level of service and the application pursuant to which the data packet is transmitted. The assigned radio priority is then forwarded with the data packet for transmission over the wireless air interface to the wireless client 105.

Figure 2:
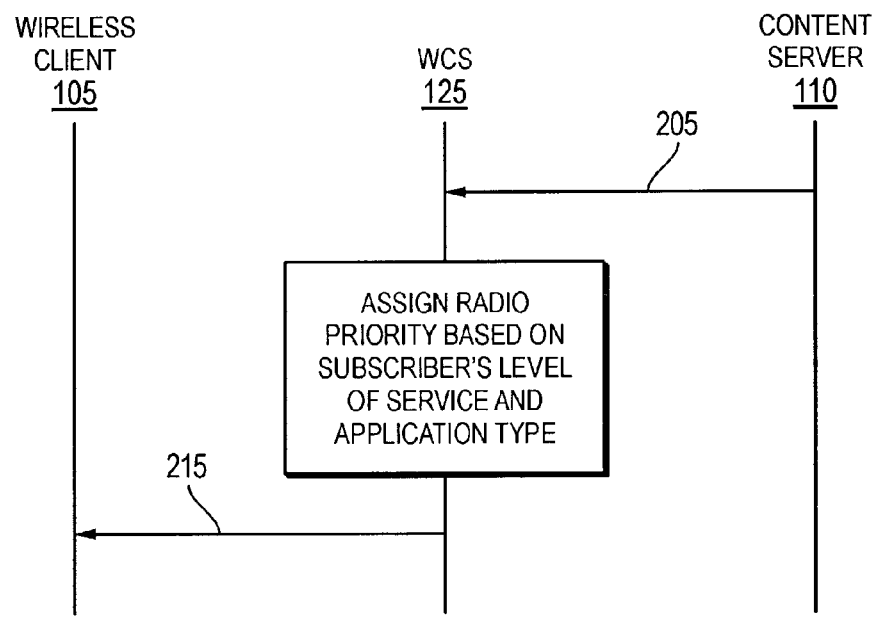
FIG. 2 is a signal flow diagram describing the operation of the communication network.

Referring now to FIG. 2, there is illustrated a signal flow diagram describing the operation of the communication network 100. A data packet (signal 205) is transmitted by the content source 110 addressed to the wireless client 105. The foregoing data packet is received by the wireless content switch 125. Upon receipt of the data packet, the wireless content switch 125 assigns a priority of transmission for the data packet which is based on both the level of service which the user of the wireless client 105 has purchased as well as the application type pursuant to which the data packet is transmitted (action 210). After assigning the priority of transmission for the data packet, the wireless content switch 125 transmits (signal 215) the data packet with the assigned priority of transmission to the wireless client 105.

Figure 3:
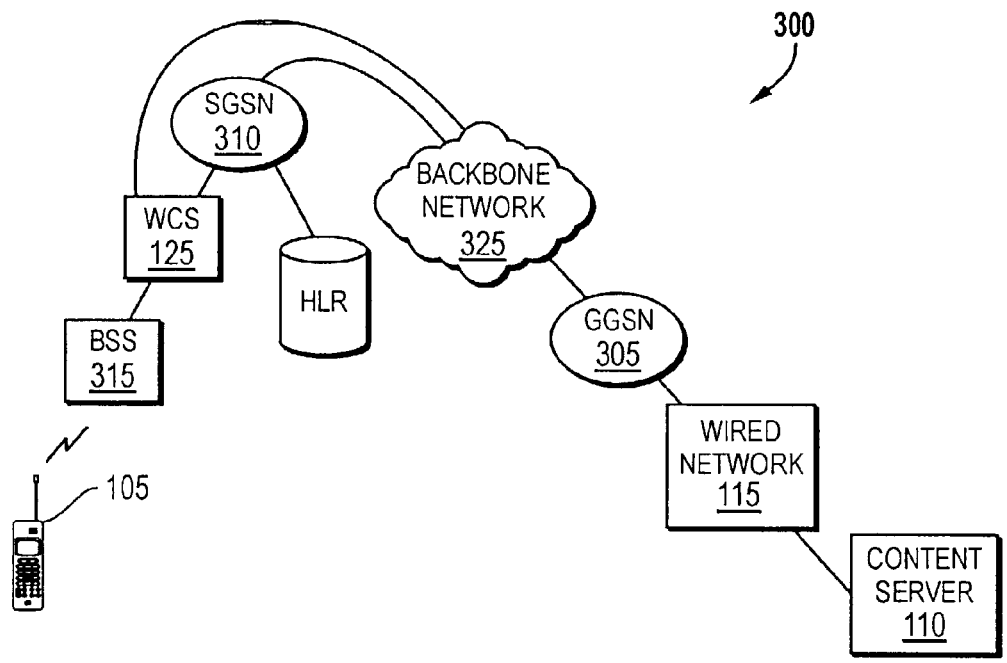
FIG. 3 is a block diagram of an exemplary communication network supporting General Packet Radio Services.

Referring now to FIG. 3, there is illustrated a block diagram of an exemplary communication network supporting General Packet Radio Services. It is noted that certain elements have been omitted for the purposes of simplicity, and therefore, the figure is not intended as an exhaustive illustration. The wireless network 120 interfaced with the wired network 115 by any number of Gateway GPRS Support Nodes (GGSN) 305. Each GCSN 305 is associated with any number of IP addresses which the GGSN 305, in turn, allocates to wireless clients 105, either statically, or dynamically.

The wireless network 120 provides packet data services to geographical areas which are divided into routing areas. Each routing area is associated with a particular Service GPRS Support Node (SGSN) 310. Each SGSN 310 is associated with any number of base station systems 315. The base station systems 315 comprise the radio transceiver equipment which transmits and receives signals to and from the wireless clients 105. Base station systems 315 maintain radio frequency communications with a geographic area known as a cell.

The SGSN 310 and the GGSN 305 are interconnected by a backbone network 325. The backbone network 325 routes packet data between the SGSN 310 and the GGSN 305. During transmission from the content server 110 to the wireless client 105, the content server 110 transmits the data packets to an IP address associated with the GGSN 305. The GGSN 305 receives the data packet, determines the identity and location of the wireless client 105 associated with the IP address, and forwards the packet towards the wireless client 105.

The network also includes a home location register (HLR) 330 which comprises a database which stores subscriber profile for each subscriber subscribing to the network. The subscriber profiles include parameters which indicate information, such as the subscription level of service which the subscriber has purchased. During establishment of an internet access for the wireless client 105, the SGSN 310 authenticates the identity of the wireless client 105 using the records stored in the HLR 330. Additionally, the SGSN 310 establishes the Quality of Service which the subscriber associated with the wireless client 105 has purchased. During an internet session, the SGSN 310 receives data packets from the content source 110 and forwards the data packets to the base station system 315. Prior to forwarding the data packets to the base station system 315, the SGSN 310 maps the quality of service parameter to a radio priority. The foregoing radio priority is then transmitted with the data packet towards the base station system 315.

Additionally, a wireless content switch 125 is connected between the base station system 315 and the SGSN 310. The interface between the SGSN 310 and the base station system 315 is known as the Gb interface. Accordingly, the wireless content switch 125 receives all signals transmitted over the Gb interface, including the data packets for transmission to the wireless client 105. In one exemplary embodiment, the wireless content switch 125 is an Intelligent Packet Control Node (IPCN) developed and manufactured by Cyneta Networks, Inc.

The wireless content switch 125 examines the IP layer of the data packets for a parameter known as the type of service parameter. The type of service parameter is indicative of the type of application pursuant to which the packet is transmitted to the wireless client 105. The wireless content switch 125 replaces the radio priority in the data packet with a new radio priority which is based on the quality of service parameters, as well as the type of service parameter. The quality of service parameter and the type of service parameter can be from different Open Systems International (OSI) layers.

Figure 4:
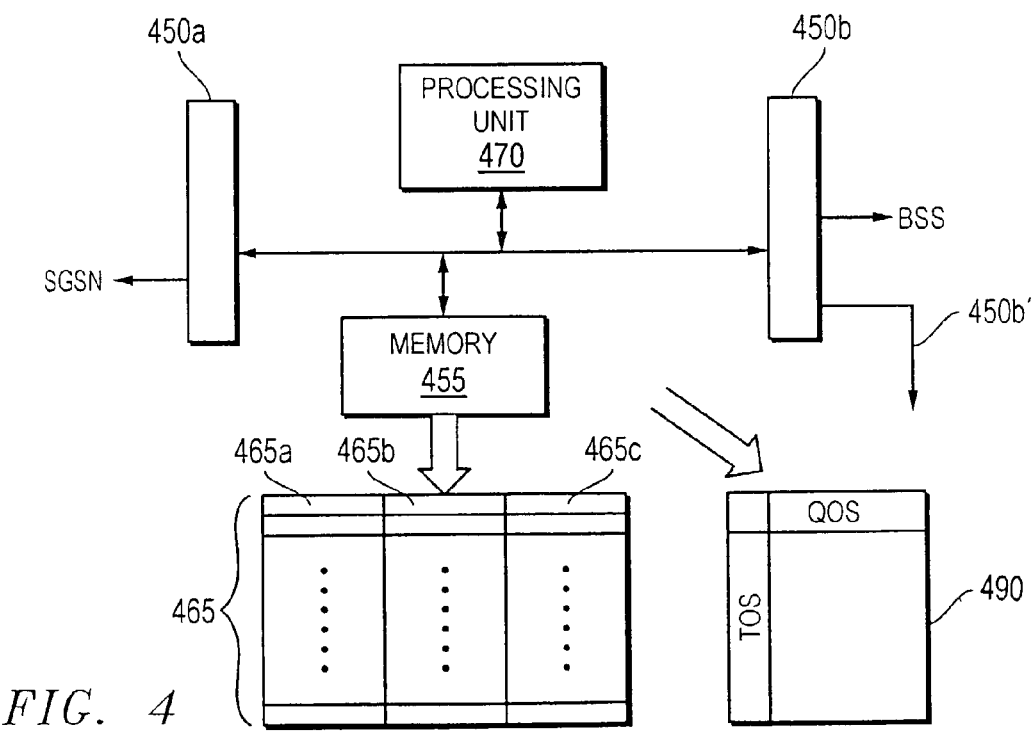
FIG. 4 is a block diagram of an exemplary wireless content switch.

Referring now to FIG. 4, there is illustrated a block diagram of an exemplary wireless content switch 125. The wireless content switch 125 includes any number of upstream ports 450a and downstream ports 450b. The upstream ports 450a facilitate connection of the wireless content switch 125 towards the content server 110 via a trunk line, such as, for example, a T1, E1, or an Ethernet connection, to name a few. In one embodiment, an upstream port 450a can be connected to the SGSN 310 via a trunk line. Similarly, the downstream ports 450b facilitated connection of the wireless content switch 125 towards the wireless client via a trunk line. In one embodiment, the downstream ports 450b can be connected to the base station system 315. Connection of the ports 450 in the foregoing matter permit receipt and transmission of the data packets which are transmitted between the wireless client 105 and the content source 110.

The wireless content switch 125 also includes memory 455 for storing a quality of service table 460. The quality of service table 460 includes any number of records 465, each of which are associated with a particular wireless client 105 receiving wireless packet data services from the SGSN 310. Each record contains a client identifier 465*a*, a client IP address identifier 465*b*, and a quality of service parameter 465*c*. The client identifier 465*a* identifies the wireless client 105 associated with the record 465. The client quality of service parameter 465*c* is the quality of service parameter 465*c* of the subscriber profile for the wireless client 105 associated with the record 465.

Additionally, the memory 455 stores a radio priority table 490. The radio priority table 490 maps various combinations of quality of service parameters, and type of service parameters with a particular priority. Therefore, the radio priority can be based on both the quality of service parameter and the type of service parameter.

In one embodiment, the quality of service parameters and the type of service parameters can be mapped to reflect the varying customer perceptions of service based on the various applications. For example, wherein the type of service indicates that the application is a video streaming application, a higher radio priority can be mapped, whereas a lower priority can be mapped wherein the type of service indicates email, notwithstanding the same quality of service parameter.

The memory 455 can also store a plurality of instruction executable by a processor 470. The foregoing instructions when executed by the processor 470 cause the processor to maintain the records 465 for each wireless client 105 which commences data services with the SGSN 310, including the IP address and quality of service associated therewith.

When a data packet is received at upstream port 450*a* for a wireless client 105, the identity of the recipient wireless client 105 and the type of service parameter are determined. The type of service parameter can be determined by examination of the TCP layer of the data packet. The identity of the wireless client 105 can be determined by examination of the destination IP address associated with the data packet and selecting the record 465 with a matching client IP address identifier 465*b*. The client quality of service 465*c* is then retrieved from the record 465. The quality of service 465*c* and the type of service parameter are then used to look up the corresponding radio priority from the radio priority table 490. The radio priority is then used to replace the radio priority in the data -packet. The wireless content switch 125 then transmits the data packet to the base station system 315.

The wireless content switch 125 is discussed further in U.S. patent application Ser. No. 09/839,830 entitled "System and Method for Wireless Packet Data Content Switch," which is commonly owned and assigned with the present application and in U.S. patent application Ser. No. 09/884,663 entitled "Packet Retransmission in Wireless Packet Data Networks," which is commonly owned and assigned with the present application and both of which are hereby incorporated by reference.

Figure 5:
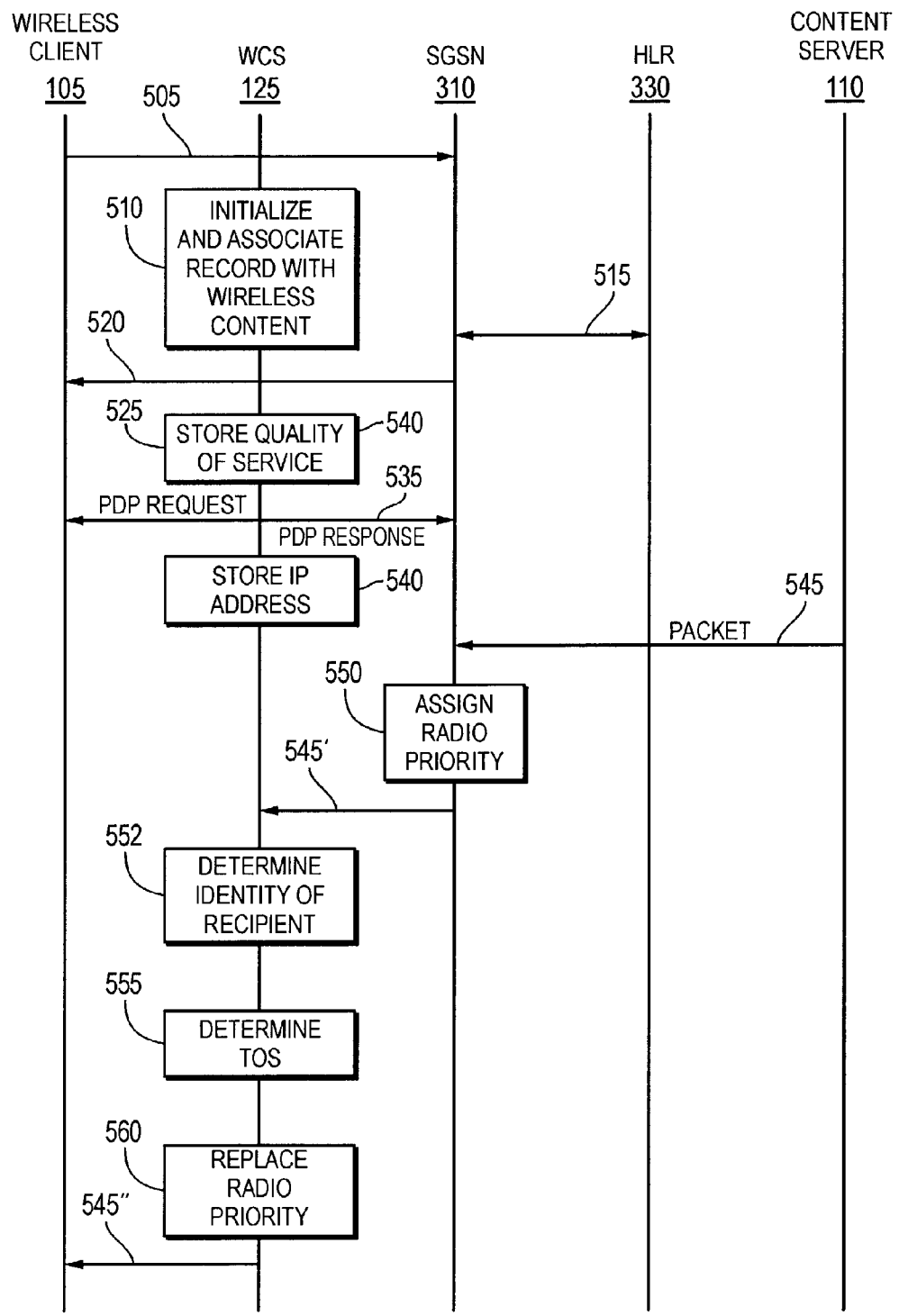
FIG. 5 is a signal flow diagram describing the operation of the communication network.

Referring now to FIG. 5, there is illustrated a signal flow diagram describing the operation of the communication network. A packet data session is commenced by the transmission of an attachment message (signal 505) from the wireless client 105 to the SGSN 310 via the base station system 315 and the wireless content switch 125. When the wireless content switch 125 receives at the downstream port 450*b* the foregoing attachment message, the wireless content switch 125 initializes a record 465 and associates the record with the wireless client 105 by storing (action 510) the identity of the wireless client 105 at the wireless client identifier of the record 465*a*. The SGSN 310 responds by querying (signal 515) the HLR 330 to authenticate the wireless client 105 and download the subscriber profile. After querying the HLR 330, the SGSN 310 transmits an attachment acknowledgment (signal 520) to the wireless client 105 via the wireless content switch 125. The attachment acknowledgment includes the subscriber profile downloaded from the HLR 330. Upon receipt of the attachment acknowledgment at the upstream port 450*a*, the wireless content switch 125 stores the quality of service parameter, in the client quality of service indicator 465*c* (action 525).

Additionally, the wireless client 105 also transmits a PDP context request to the SGSN 310 which responds by transmitting a PDP context response (signals 535). The IP address associated with the wireless client 105 is contained in either the PDP request or PDP response, depending on whether the wireless client 105 is allocated the IP address on a static or dynamic basis. Both the PDP request and response are received at the wireless content switch 125 at the downstream port 450*b* and the upstream port 450*a*, respectively. Upon receipt of the foregoing signals, the wireless content switch 125 stores the IP address associated with the wireless client 105 in the IP address identifier 465*b* of the record 465 associated with the wireless client 105 (action 540).

Upon completion of the PDP request/response signaling, the wireless client 105 commences an internet session. Pursuant to the session, the content source 110 transmits data packets (signal 545) which are associated with a particular type of application addressed to the wireless content switch 105. The type of application can include, for example, web browsing (hypertext protocol transmission, http), a file transfer (file -transfer protocol, ftp), email (simple mail transmission protocol, SMTP), streaming video, or streaming audio, to name a few. The data packets are received by the SGSN 310 which assigns (action 550) a radio priority to the data packets, based on the quality of service parameter in the subscriber profile associated with the wireless client 105. The data packet with the radio priority is then transmitted (signal 545') towards the wireless client 105 via the wireless content switch 125. The wireless content switch 125 receives the data packet at the upstream port 450*a*.

When the data packet is received at upstream port 450*a* for a client 105, the identity of the recipient wireless client 105 (action 552) and the type of service parameter are determined (action 555). The type of service parameter can be determined by examination of the TCP layer of the data packet. The identity of the wireless client 105 can be determined by examination of the destination IP address, associated with the data packet and selecting the record 465 with a matching client IP address identifier 465*b*. The client quality of service 465*c* is then retrieved from the record 465. The quality of service 465*c* and the type of service parameter are then used to look up the corresponding radio priority from the radio priority table 490. The radio priority is then used to replace the radio priority in the data packet (action 560). The wireless content switch 125 then transmits the data packet (signal 545") to the base station system 315 via the downstream port 450*a*.

Although the foregoing detailed description describes certain embodiments with a degree of specificity, it should be noted that the foregoing embodiments are by way of example, and are subject to modifications, substitutions, or alterations without departing from the spirit or scope of the invention. For example, one embodiment can be implemented as sets of instructions resident in memory 455. In another embodiment, the wireless content switch 125 may be integrated with either the SGSN 310 or the base station system 315. Those skilled in the art will recognize that physical storage of instructions physically changes the medium upon which it is stored electronically, magnetically, or chemically so that the medium carries computer readable information. Accordingly, the inventions are only limited by the following claims, and equivalents, thereof.

What is claimed is:

1. A method of transmitting data packets to a wireless client, said method comprising:
   receiving a data packet for a particular wireless client;
   determining a quality of service parameter associated with the wireless client;
   determining a type of service parameter associated with the data packet;
   selecting a new radio priority for the data packet from a radio priority table based on the type of service and quality of service parameters; and
   replacing an original radio priority with the new radio priority.

2. The method of claim 1, further comprising:
   transmitting the data packet with the radio priority.

3. The method of claim 1, wherein receiving the data packet further comprises receiving a data packet with an original radio priority.

4. The method of claim 3, wherein receiving the data packet with an original radio priority further comprises:
   receiving the data packet with an original radio priority based on a quality of service parameter associated with the wireless client.

5. The method of claim 1, further comprising assigning the selected new radio priority to the data packet.

6. The method of claim 5, wherein determining the quality of service parameter associated with the wireless client further comprises:
   determining the identity of the wireless client; and
   retrieving the quality of service parameter associated with the wireless client.

7. The method of claim 5, wherein determining the type of service parameter associated with the data packet further comprises:
   examining a transmission control protocol layer of the data packet.

8. The method of claim 1, wherein the parameters are from two or more Open Systems International (OSI) layers.

9. A wireless content switch for transmitting data packets to a wireless client, said wireless content switch comprising:
   an upstream port for receiving a data packet for a particular wireless client;
   a bus coupled to the upstream port;
   memory coupled to the bus, the memory for storing executable code and a radio priority table; and
   a processor for executing the executable code, the code, when executed selecting a new radio priority from the radio priority table for the data packet based or two or more parameters comprising a type of service parameter and a quality of service parameter associated with the wireless client, and replacing an original radio priority with the new radio priority.

10. The wireless content switch of claim 9, further comprising:
    a downstream port coupled to the bus, the downstream port for transmitting the data packet with the new radio priority for the data packet based on two or more parameters.

11. The wireless content switch of claim 9, wherein the upstream port receives the data packet with the original radio priority.

12. The wireless content switch of claim 9, wherein the upstream port receives the data packet with the original radio priority based on a quality of service parameter.

13. The wireless content switch of claim 9, wherein the memory stores a plurality of records, each of said plurality of records associated with a wireless client, each of said plurality of records comprising:
    a wireless client internet protocol (IP) address identifier for identifying an IP address for the wireless client associated with the record; and
    a wireless client quality of service identifier for identifying the quality of service for the wireless client associated with the record.

14. The wireless content switch of claim 9, wherein the executable code, when executed determining the type of service parameter by examining a transmission control protocol layer of the data packet.

* * * * *